V. N. GINGRICH.
DETACHABLE RIM.
APPLICATION FILED JUNE 8, 1917.
1,259,974.
Patented Mar. 19, 1918.
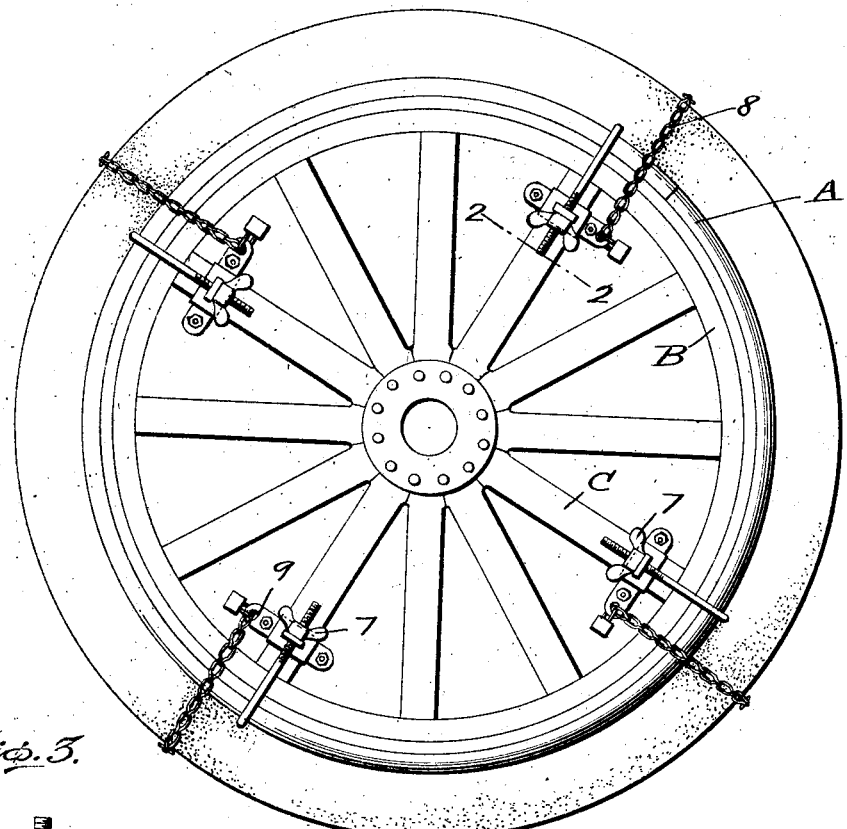
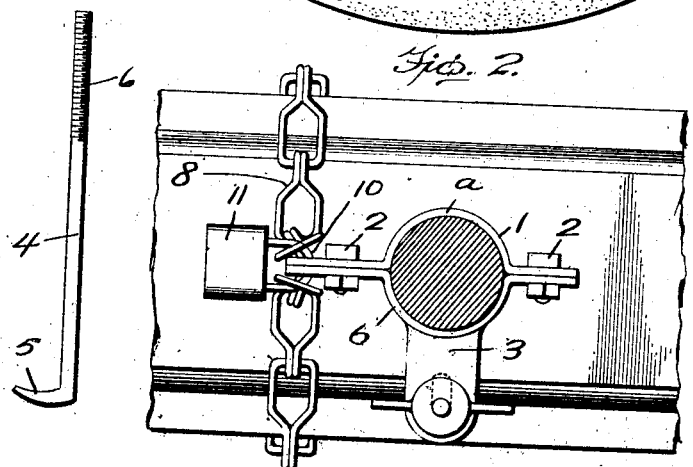
WITNESSES
INVENTOR
Victor N. Gingrich
BY
ATTORNEY

UNITED STATES PATENT OFFICE.

VICTOR N. GINGRICH, OF HERSHEY, PENNSYLVANIA.

DETACHABLE RIM.

1,259,974.    Specification of Letters Patent.    Patented Mar. 19, 1918.

Application filed June 8, 1917. Serial No. 173,580.

*To all whom it may concern:*

Be it known that I, VICTOR N. GINGRICH, a citizen of the United States, residing at Hershey, in the county of Dauphin and State of Pennsylvania, have invented certain new and useful Improvements in Detachable Rims, of which the following is a specification.

This invention relates to a novel means adapted to secure detachable rims, such as those used on automobiles, to the felly of vehicle wheels.

The common way of applying demountable rims on vehicle wheels is by hammering them on until the rim has assumed its proper position.

It is very often the case that while hammering one side of the rim the other side of the rim jumps out of place.

It is an object of the present invention to provide a demountable rim for a vehicle wheel that can be easily placed on the felly of the wheel without hammering or the aid of other tools, and the provision of retaining means detachably secured to the spokes of the wheel to secure the demountable rim in position by easy manual manipulations.

Another object of the invention resides in the provision of a combined rim securing means and an anti-skid device.

With the above objects in view, the invention consists of clamping means which are adapted to be removably secured to the spokes of the wheel and which have mounted thereon securing hooks which engage the side edges of the rim and are adapted to be tightened to hold it upon the felly of the wheel; and of an anti-skid chain adapted to extend around the tire of the wheel and to be secured and locked to the clamp.

Other features of the invention will be apparent from the following description setting forth the specific construction, combination and arrangement of parts which are finally pointed out in the appended claims.

In the drawings which illustrate the invention:

Figure 1— is a side elevation of a wheel equipped with the invention,

Fig. 2— is a fragmentary sectional view taken substantially on line 2—2— of Fig. 1 and Fig. 3— is an enlarged detailed view of the rim securing member.

Like characters denote similar and like parts throughout the specification and drawing.

The invention more particularly consists of a clamp 1 composed of complemental sections $a$ and $b$ bent intermediate their ends to a substantially semi-circular formation in order to form a collar when the sections are in position. The clamp is adapted to fit about the spokes of an ordinary vehicle wheel and is secured in position by the nut and bolt fastening means 2 extended over the ends of the sections $a$ and $b$ as clearly illustrated. The clamps 1 are preferably positioned adjacent the felly of the wheel. As shown in Fig. 2, the section $b$ is provided with a projection 3 that extends laterally therefrom. Each of the outer ends of the projections have a hole or opening therein. A rim engaging member 4 is slidably positioned in the hole. The member 4 is preferably an elongated rod having one end formed with a lateral hook extension 5 and the other end threaded, as indicated at 6, threadedly receiving the winged nut 7. When the clamping members 1 are secured in position on the spokes of a wheel, the hook ends 5 of the rim engaging members 4 are adapted to engage with the side flanges of the demountable rim A. Upon rotating the winged nuts 7 on the threaded ends 6 of the members 4, the nuts are caused to bear against the under surface of the extension 3. This will cause the members 4 to draw the rim closer to the felly B of the wheel. As many of the securing devices may be used as are found desirable and practical.

The invention, also, contemplates the provision of an anti-skid means which will eliminate the expensive chain constructions now commonly used. The invention provides a plurality of single chains 8 adapted to pass over the circumference of the tire and each to have its ends secured and locked to one of the clamping members 1. For this purpose one of the ends of the sections a and b is extended and formed with registering openings 9 through which may extend the shackle 10 of a padlock 11. As shown in Fig. 2, the ends of the chain 8 are adapted to have the shackle 10 pass therethrough to facilitate the securing of the anti-skid chain to the clamp 1. As many anti-skid chains 8 may be used as there are clamping devices 1. The chains are preferably arranged in a uniform spaced relation around the circumference of the wheel.

Obviously the present invention provides simple and effective means for efficiently holding the demountable rim upon the felly of the wheel and for permitting quick and easy mounting and dismounting of the rim to the wheel without the aid of tools. Also the invention provides anti-skidding devices for the wheel which will at all times be held in position and against rattling, since the clamping members 1 may be longitudinally adjusted upon the spokes C of the wheel according to the length of the chains 8.

The above clearly described my invention, however, it is to be understood that certain changes in the construction, combination and arrangement of parts may be resorted to that fall within the legitimate scope of the appended claims.

What is claimed is:

1. A device of the character described which comprises clamps having removable engagement with the spokes of a wheel, a radially movable rim engaging member adapted to be slidably engaged with the clamp, means for detachably securing the rim engaging member in position for holding a rim on the wheel, and means on each clamp for attaching an anti-skid chain.

2. A device of the character described comprising, a clamp adapted to be removably secured to the wheel, a rim engaging bolt consisting of a shank having a hook end to engage the rim, said shank having slidable connection with the clamp, and means threaded on the bolt for moving it relative to the clamp for securing the rim on the wheel.

3. A device of the character described comprising, a clamp consisting of complemental sections to engage about a spoke of the wheel and to be removably secured thereto, a projection extending from one of the sections of the clamp and having an opening therein, a rim engaging bolt slidably extended through the said opening and having a hooked end to engage the rim, and a thumb nut threaded on the bolt and adapted to bear against said projection whereby the rim may be held firmly on the wheel.

4. A device of the character described comprising, a clamp consisting of complemental sections to engage about a spoke of the wheel and to be removably secured thereto, a projection extending from one of the sections of the clamp and having an opening therein, a rim engaging bolt slidably extended through the said opening and having a hooked end to engage the rim, a thumb nut threaded on the bolt and adapted to bear against said projection whereby the rim may be held firmly on the wheel, and the sections of said clamps having registered openings therein, through which an anti-skid chain may pass.

5. In a wheel, the combination with a felly, and a rim mounted on the felly, of a plurality of clamps adapted to be secured to the spokes of a wheel, removable and adjustable rim engaging members having a slidable connection with the clamps, and means for radially moving and securing said members relative to the clamps for retaining the rim on the wheel.

In testimony whereof I affix my signature in presence of two witnesses.

VICTOR N. GINGRICH.

Witnesses:
H. W. STINE,
J. B. SNEATH.